United States Patent van Jaarsveld et al.

[11] Patent Number: 5,948,347
[45] Date of Patent: Sep. 7, 1999

[54] METHOD OF MAKING A STEERING HAND WHEEL INSERT

[75] Inventors: Robert Phil van Jaarsveld, Macomb, Mich.; Duane David Williams, Beavercreek, Ohio; Suresh Deepchand Shah, Troy, Mich.; Duane Eric Jones, Clawson, Mich.; Jayprakash Uttamchand Raisoni, Rochester Hills, Mich.

[73] Assignee: General Motors Corporation, Detroit, Mich.

[21] Appl. No.: 09/088,545

[22] Filed: Jun. 1, 1998

[51] Int. Cl.[6] .................................................. B29C 45/00
[52] U.S. Cl. ............................................ 264/572; 425/130
[58] Field of Search ............................... 264/572; 425/130

[56] References Cited

U.S. PATENT DOCUMENTS

| | | | |
|---|---|---|---|
| 4,640,150 | 2/1987 | Kobayashi et al. | 74/552 |
| 5,070,742 | 12/1991 | Sakane et al. | 74/552 |
| 5,254,306 | 10/1993 | Inada et al. | 264/572 |
| 5,304,341 | 4/1994 | Shah | 264/572 |
| 5,395,582 | 3/1995 | Shigeno et al. | 264/572 |
| 5,445,048 | 8/1995 | Kaufer et al. | 74/552 |
| 5,628,519 | 5/1997 | Kakehi | 277/26 |
| 5,636,859 | 6/1997 | Williams et al. | 280/728.2 |

FOREIGN PATENT DOCUMENTS 5-170106  7/1993  Japan .

*Primary Examiner*—Catherine Timm
*Attorney, Agent, or Firm*—Kathryn A. Marra

[57] ABSTRACT

A method of making a steering hand wheel insert including the steps of: (a) in a gas assisted injection molding apparatus, forming a mold cavity having a ring-shaped outer channel, an inner channel, and a plurality of spoke channels; (b) forming a stationary mold insert in the outer channel dividing the latter into a pair of symmetric outer channel segments having downstream ends connected by a plurality of choke passages around the stationary mold insert; (c) injecting a short shot of a flowable plastic melt into each of the outer channel segments through a gate diametrically opposite the stationary insert and into the inner channel through a second gate; (d) injecting inert gas under pressure into the flowable plastic melt diametrically opposite the stationary insert; (e) maintaining the gas pressure until all of the flowable plastic melt cures in the mold cavity, (f) relieving the pressure of the inert gas, and (g) opening the mold cavity and removing the molded plastic steering hand wheel insert having a hollow tubular rim, a solid plastic inner bracket, and a plurality of integral spokes.

5 Claims, 3 Drawing Sheets

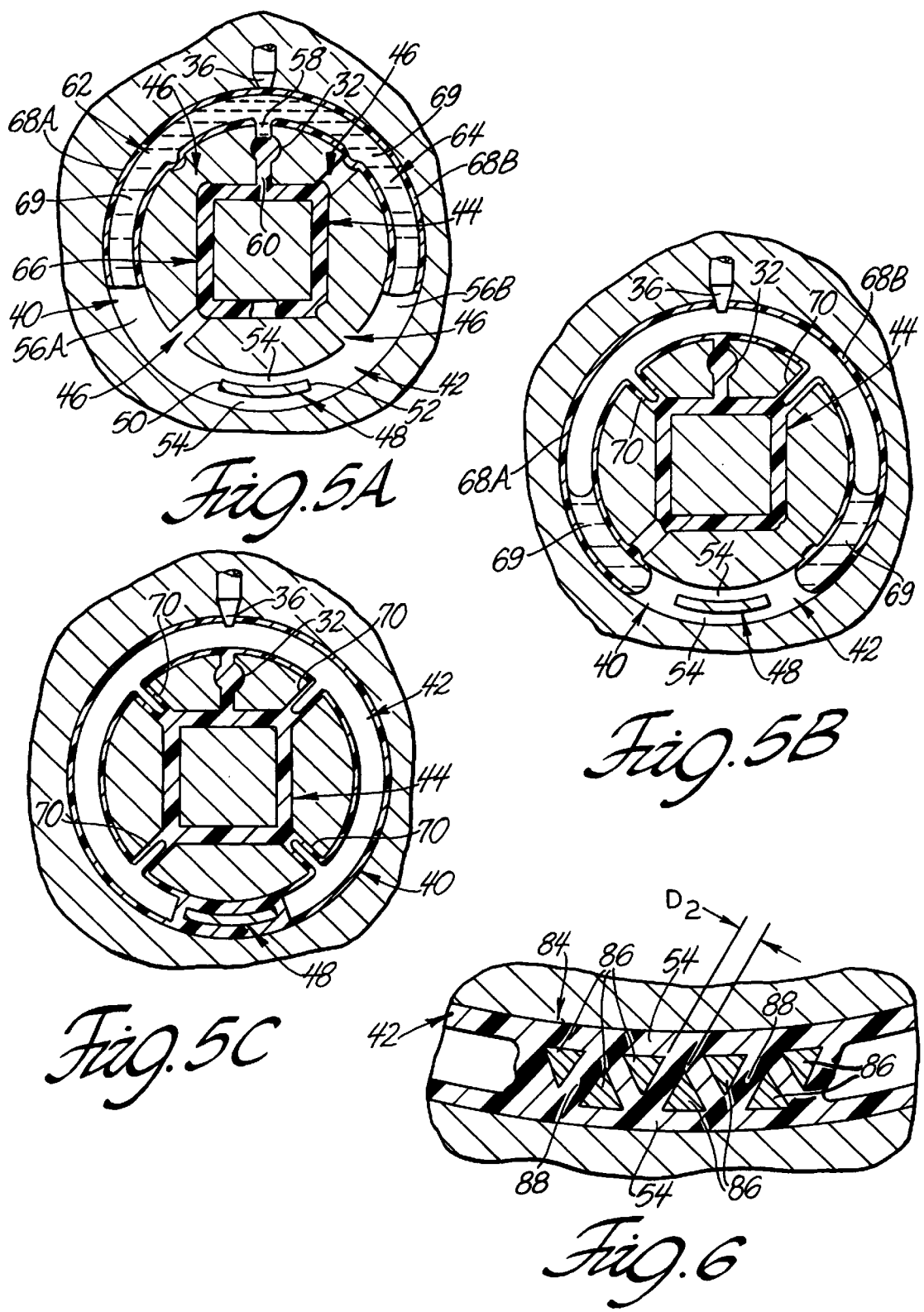

METHOD OF MAKING A STEERING HAND WHEEL INSERT

TECHNICAL FIELD

This invention relates to a method of making a plastic insert for a steering hand wheel for a motor vehicle.

BACKGROUND OF THE INVENTION

A steering hand wheel for a motor vehicle typically includes a rigid frame commonly referred to as an insert and a urethane foam cover over the insert which enhances the operator's comfort and the appearance of the hand wheel. The insert usually includes a ring-shaped rim where an operator grasps the hand wheel, an inner bracket, and a plurality of spokes between the rim and the inner bracket. In the past, such steering hand wheel inserts have been made as solid magnesium die castings. Molded solid plastic steering hand wheels have also been made in the past for small, off-highway motor vehicles such as lawn and garden tractors. In addition, blow molded plastic steering hand wheels have been made for toy vehicles. None of such solid plastic or blow molded plastic steering hand wheels are suitable for on-highway motor vehicles. It has, however, been proposed to manufacture a plastic steering hand wheel for an on-highway motor vehicle by making a preform out of injection molded polypropylene and press stretching the preform after the latter is heated to a temperature of about 165° C. A method according to this invention of making a steering hand wheel suitable for an on-highway motor vehicle is a novel alternative to the methods described above.

SUMMARY OF THE INVENTION

This invention is a new and improved method of making a plastic insert for steering hand wheel including the steps of: (a) in a gas assisted injection molding apparatus, forming a mold cavity having a ring-shaped outer channel, an inner channel, and a plurality of spoke channels; (b) forming a stationary mold insert in the outer channel dividing the latter into a pair of symmetric outer channel segments having downstream ends connected by a plurality of choke passages around the stationary mold insert; (c) injecting a short shot of a flowable plastic melt into each of the outer channel segments through a gate located diametrically opposite the stationary mold insert and into the inner channel through a second gate; (d) injecting gas under pressure into the flowable plastic melt in the outer channel diametrically opposite the stationary mold insert; (e) maintaining the gas pressure until all of the flowable plastic melt cures; (f) venting the gas from the mold cavity, and (g) opening the mold cavity and removing a molded plastic steering hand wheel insert having a hollow tubular rim, a solid plastic inner bracket, and a plurality of hollow tubular spokes integral with the rim and the inner bracket. The flowable plastic melt cures solid in the choke passages to prevent gas from bleeding through the choke passages from one of the outer channel segments to the other.

BRIEF DESCRIPTION OF THE DRAWINGS

FIGS. 5A–5C are similar to FIG. 2 illustrating the progression of flowable plastic melt and gas penetration during practice of the method according to this invention of making a steering hand wheel insert;

FIG. 6 is an enlarged view of a portion of FIG. 5C illustrating a modified stationary mold insert.

DESCRIPTION OF THE PREFERRED EMBODIMENT

Figure 1:
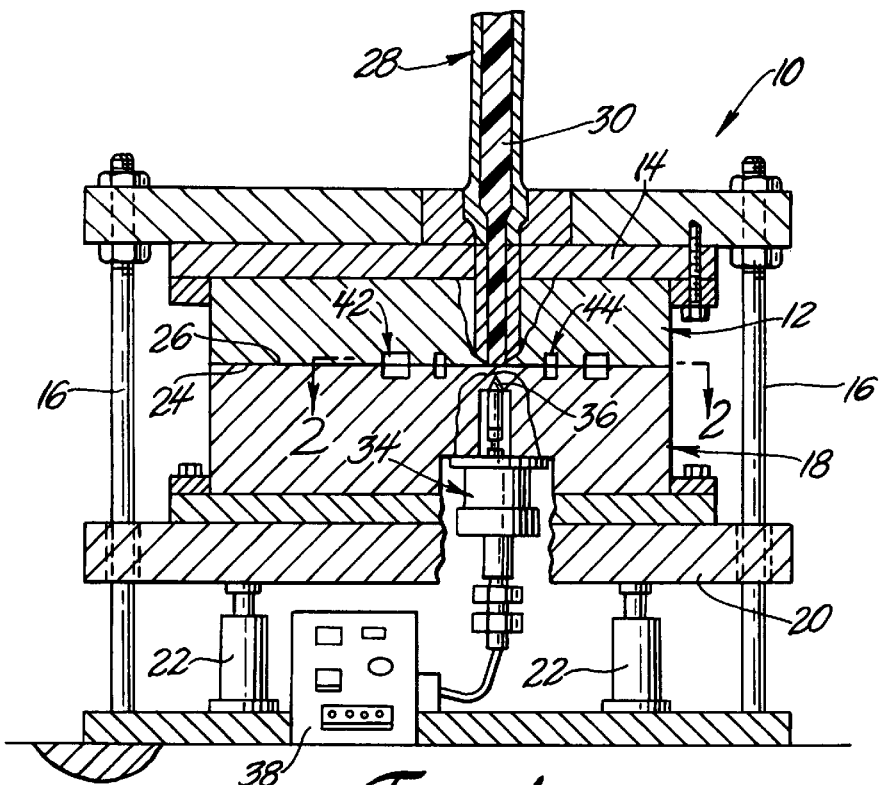
FIG. 1 is a partially broken-away schematic view of a gas assisted plastic injection molding apparatus for practicing the method according to this invention of making a steering hand wheel insert.

Referring to FIG. 1, a schematically represented gas assisted injection molding apparatus 10 includes an upper mold half 12 bolted to a plate 14 held stationary by a plurality of tie rods 16. A lower mold half 18 of the apparatus 10 on a platen 20 is moveable toward and away from the upper mold half by a plurality of actuators 22. When the molding apparatus 10 is open, a pair of facing surfaces 24,26 on the upper and lower mold halves, respectively, are separated vertically. When the molding apparatus is closed, the actuators 22 thrust the facing surfaces 24,26 together to rigidly unite the upper and lower mold halves.

Figure 2:
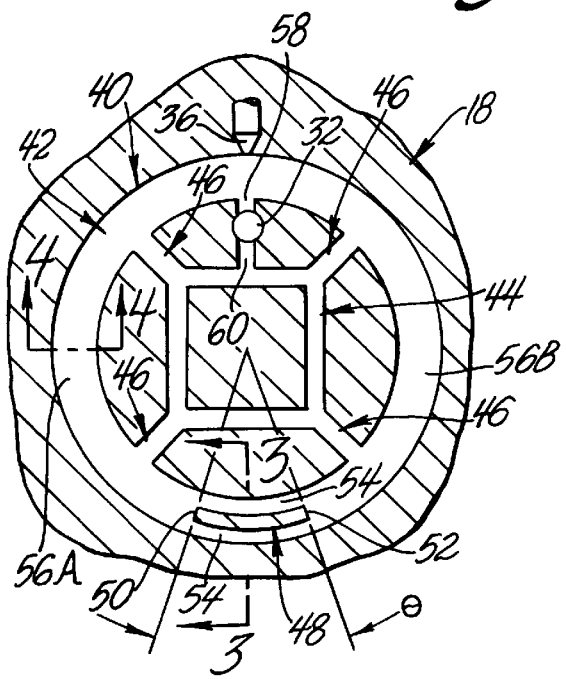
FIG. 2 is an enlarged sectional view taken generally along the plane indicated by lines 2—2 in FIG. 1.
Figure 3:
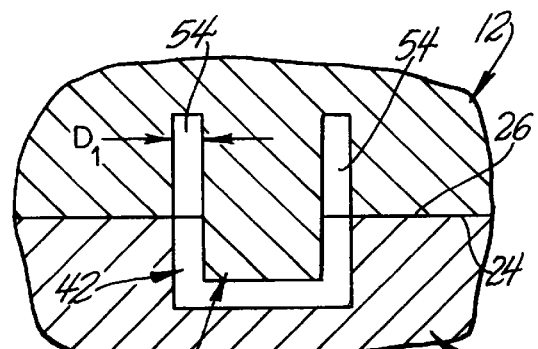
FIG. 3 is an enlarged sectional view taken generally along the plane indicated by lines 3—3 in FIG. 2.

A plastic injector unit 28 of the molding apparatus brings a thermoplastic material such as nylon to a viscous or flowable state within a predetermined temperature and density range and homogenizes the plastic into a flowable melt 30 in a cylindrical barrel of the injector unit in flow communication with a sprue passage 32, FIG. 2, in the upper and lower mold halves. Stroking movement of a piston, not shown, of the injector unit forces the flowable plastic melt into the sprue passage. A gas injector unit 34 of the molding apparatus 10 is connected to a source of inert gas such as nitrogen under pressure and includes a gas nozzle having a schematically represented retractable injector tip 36 which opens and closes in accordance with commands from a control console 38.

Figure 4:
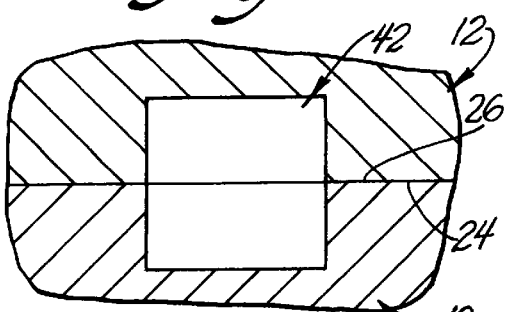
FIG. 4 is an enlarged sectional view taken generally along the plane indicated by lines 4—4 in FIG. 2.

With reference to FIGS. 2–8, a method according to this invention of making a steering hand wheel insert commences with forming grooves in the facing surfaces 24,26 of the upper and the lower mold halves 12,18 which cooperate when the molding apparatus 10 is closed in forming a mold cavity 40 having a ring-shaped outer channel 42, an inner channel 44 shaped like a rectangle, and a plurality of spoke channels 46 between the inner and the outer channels. The cross sectional shape of the outer channel 42 constitutes a design choice and may be rectangular as illustrated in FIGS. 1 and 4, round, oval, or the like. Likewise, the cross-sectional shapes of the inner channel 44 and of the spoke channels 46 are design choices and may also be rectangular, round, oval, U-shaped, or the like.

The next step in the method according to this invention is forming an arc-shaped stationary mold insert 48 in the outer channel 42 having a first end 50 and a second end 52. The stationary mold insert 48 is illustrated as being integral with the upper mold half 12 but may be integral with or otherwise rigidly attached to either of the upper or the lower mold halves. The stationary mold insert 48 obstructs the outer channel in an arcuate segment "θ" of the outer channel, FIG. 2, of about 10°–50° and cooperates with the surrounding walls of the outer channel in defining a plurality of narrow choke passages 54, FIG. 3, each having a depth dimension "$D_1$" in a range of between about 2 mm and 4 mm. The stationary mold insert 48 divides the outer channel 42 into a pair of symmetric outer channel segments 56A,56B on opposite sides of the stationary mold insert.

After the stationary mold insert is formed in the outer channel 42, a short shot of the flowable plastic melt 30 is injected into the mold cavity 40 through a first gate 58 in the outer channel and through a second gate 60 in the inner channel 44 each connected to the sprue passage 32. A short shot of the flowable plastic melt 30 constitutes about 60% to 90% of the capacity of the mold cavity 40. Importantly, the first gate 58 is located substantially diametrically opposite the stationary mold insert 48 to assure that a first flowable melt portion 62 in the first outer channel segment 56A substantially equals a second flowable melt portion 64 in the second outer channel segment 56B, FIG. 5A. The location of the second gate 60 constitutes a design choice calculated to fill between 90% and 100% of the inner channel 44 with a third flowable melt portion 66, FIG. 5A.

The first and the second flowable melt portions 62,64 contact the walls of the mold cavity 40 defining the outer channel segments 56A,56B and cure solid as a pair of tubular shells 68A,68B each having a viscous liquid flowable melt 69 therein, FIG. 5A. At the same time, the third flowable melt portion 66 similarly contacts and cures solid at the walls of the mold cavity 40 defining the inner channel 44. The cross sectional shape of the inner channel 44 is calculated to assure that the flowable melt portion 66 relatively quickly cures substantially solid across the complete cross section of the inner channel. Also, the mold halves 12,18 around the inner channel may be highly thermally conductive to promote faster curing of the flowable plastic melt portion 66 therein.

After the short shot of flowable plastic melt 30 is injected into the mold cavity 40, inert gas under pressure is injected into the outer channel 42 through the gas injector tip 36 at a location substantially diametrically opposite the stationary mold insert 48, FIGS. 2 and 5B. The inert gas thus injected splits evenly between the tubular shells 68A,68B of cured plastic, FIG. 5B, and expels or pushes out the liquid flowable plastic melt 69 from the tubular shells toward the downstream ends of the first and the second outer channel segments defined by the opposite ends 50,52 of the stationary mold insert 48.

As the liquid flowable melt 69 pushed out of the tubular shells 68A,68B contacts the walls of the mold cavity 40 defining the first and the second outer channel segments 56A,56B, the lengths of the tubular shells 68A,68B increase toward the stationary mold insert 48. At the opposite ends 50,52 of the stationary mold insert, the liquid flowable melt 69 flows into the choke passages 54 from opposite ends thereof. Because of the narrowness of the choke passages 54, the liquid flowable melt 69 cures relatively quickly therein to block the choke passages and prevent the inert gas in one of the outer channel segments 56A,56B from bleeding into or crossing over into the other of the outer channel segments. Such crossing over of the inert gas can affect the uniformity of the wall thickness and, hence, the structural integrity of the tubular shells 68A,68B. To further reduce the likelihood of the inert gas bleeding through the choke passages, transducers, not shown, may be located at the choke passages to monitor the condition of the flowable plastic melt and signal the control console 38 to reduce the pressure of the inert gas as the flowable melt cures solid in the choke passages.

With the downstream ends of the first and the second outer channel segments thus isolated from each other, the inert gas travels into the spoke channels 46 and pushes additional liquid flowable melt 69 from tubular shells 68A, 68B into the spoke channels, FIGS. 5B–5C, so that a plurality of tubular shells 70 of cured plastic are formed in the spoke channels. The liquid flowable melt 69 pushed by the inert gas from the tubular shells 70 in the spoke channels flows into any empty portions of the inner channel 44 and cures solid, thereby completely filling the inner channel with solid plastic. The gas pressure is maintained in the tubular shells 68A,68B and in the tubular shells 70 for a time duration sufficient for all of the liquid flowable melt in the mold cavity to cure solid. The liquid flowable melt 69 that is continuously forced into the inner channel 44 makes up for any shrinkage of the cured plastic in the inner channel.

Figure 7:
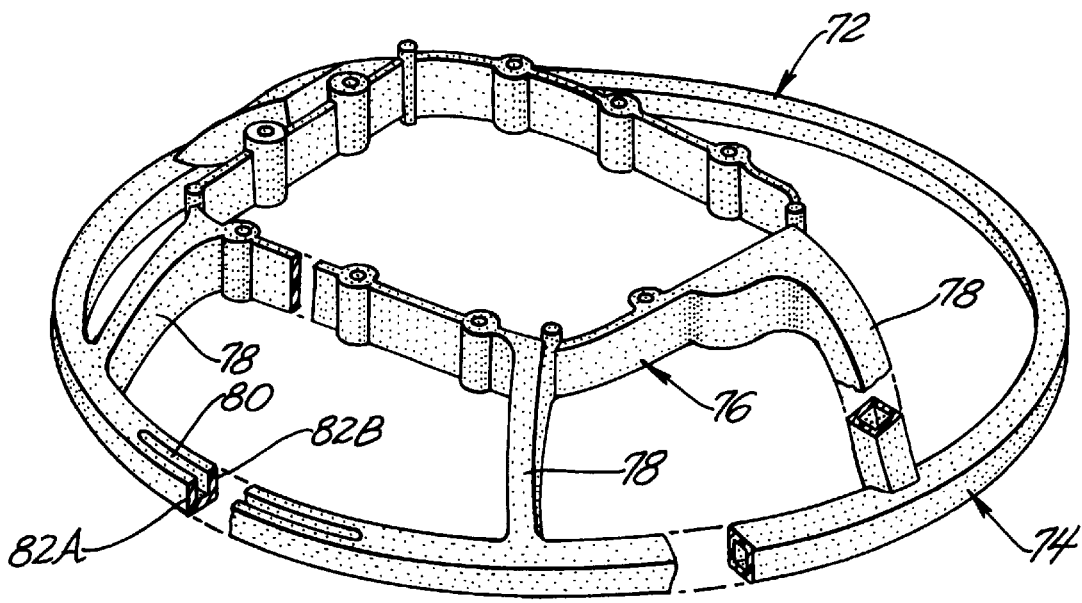
FIG. 7 is a broken-away perspective view a steering hand wheel insert made by the method according to this invention.

After all of the flowable plastic melt in the mold cavity 40 cures, the gas pressure in the tubular shells 68A,68B,70 is relieved. Then, the mold halves 12,18 are separated and a structurally self-sustaining molded plastic steering hand wheel insert 72, FIG. 7, is removed from the molding apparatus 10. The hand wheel insert 72 has a hollow tubular rim 74 in the shape of the tubular shells 68A,68B in the outer channel segments 56A,56B, a solid plastic inner bracket 76 in the shape of the inner channel 44, and a plurality of hollow spokes 78 in the shape of the tubular shells 70 in the spoke channels 46. The otherwise tubular rim 74 has an arcuate cavity 80 corresponding to the shape of the stationary mold insert 48. A pair of rim wall segments 82A,82B of the rim 74, FIG. 7, span the length of the arcuate cavity 80. The inner bracket 76 defines a platform for supplemental inflation restraint apparatus, not shown, and for a mounting plate, not shown, through which the hand wheel insert 72 is attached to a steering shaft of a motor vehicle.

The rim wall segments 82A,82B are reinforced against lateral flexure into the arcuate cavity 80 when a schematically represented modified stationary mold insert 84, FIG. 6, is used in place of the stationary mold insert 48. The modified stationary mold insert 84 consists of a plurality of triangle-shaped pins 86 arrayed in the middle of the outer channel 42 diametrically opposite the first gate 58 and the gas injector tip 36. The triangle-shaped pins cooperate with each other and with the surrounding walls of the outer channel in defining a plurality of crossing choke passages 88 in flow communication with the aforesaid choke passages 54. The crossing choke passages 88 each have a depth dimension "$D_2$" in a range of between about 2 mm and 4 mm so that the liquid flowable melt expelled from the tubular shells 68A,68B cures solid in the choke passages 54 and in the crossing choke passages 88 at the same time. When the molded plastic hand wheel insert 72 is thereafter removed from the mold cavity 40, the cured plastic in the crossing choke passages 88 reinforces the rim wall segments 82A, 82B against lateral flexure into the arcuate cavity 80.

Figure 8:
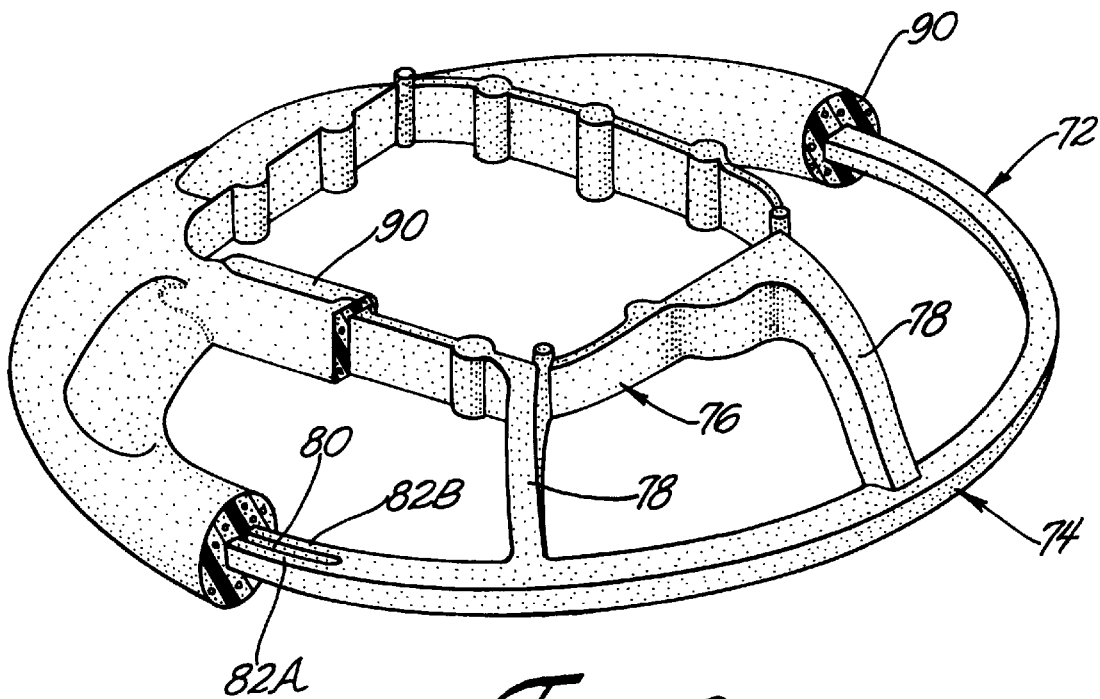
FIG. 8 is a broken-away perspective view of a motor vehicle steering hand wheel having a plastic insert made by the method according to this invention and a urethane foam cover over the plastic insert.

After the hand wheel insert 72 is removed from the molding apparatus 10, a urethane foam cover 90, FIG. 8, is further molded over the rim 74, the spokes 78 and the inner bracket 76 of the hand wheel insert. The cover 90 enhances an operator's comfort when gripping the rim of the hand wheel insert and enhances the appearance of the steering hand wheel.

Having thus described the invention, what is claimed is:

1. A method of making a molded plastic steering hand wheel comprising the steps of:

forming a mold cavity between an upper mold half and a lower mold half including a ring-shaped outer channel and an inner channel and a plurality of spoke channels between said outer channel and said inner channel, forming a mold insert in said outer channel of said mold cavity dividing said outer channel into a first outer channel segment having a downstream end at a first end of said mold insert and a symmetric second outer channel segment having a downstream end at a second end of said mold insert, forming a plurality of choke passages from said first end of said mold insert to said second end of said mold insert connecting said downstream end of said first outer channel segment to said downstream end of said second outer channel segment, injecting a short shot of a flowable plastic melt into said mold cavity through a first gate connected to said outer channel and located substantially diametrically opposite said mold insert therein so that a first flowable melt portion is distributed to said first outer channel segment and a substantially equal second flowable melt portion is distributed to said second outer channel segment and through a second gate connected to said inner channel, injecting pressurized gas into said outer channel through a gas injection nozzle tip located substantially opposite said mold insert in said outer channel so that each of said first and said second flowable melt portions is caused to flow as a continuous layer against the walls of the corresponding one of said first and said second outer channel segments and to fill from opposite ends of and to cure solid in each of said choke passages to isolate said downstream end of said first outer channel segment from said downstream end of said second outer channel segment, maintaining the pressure of said injected gas after said flowable plastic melt cures solid in said choke passages to force each of said first and said second flowable melt portions to flow into respective ones of said spoke channels and into said inner channel for a time duration sufficient for all of said short shot of flowable plastic melt to cure in said mold cavity, relieving the pressure of said injected gas, and separating said first mold half from said second mold half and removing from said mold cavity said steering hand wheel insert having a hollow tubular outer rim shaped like said outer channel with a molded cavity therein shaped like said mold insert and a solid inner bracket shaped like said inner channel and a plurality of integral spokes shaped like said spoke channels.

2. The method of making a molded plastic steering hand wheel insert recited in claim 1 wherein the step of forming a plurality of choke passages from said first end of said mold insert to said second end of said mold insert comprises:

forming each of said choke passages with a depth dimension in a range of between about 2 mm and 4 mm.

3. The method of making a molded plastic steering hand wheel insert recited in claim 2 further comprising the step of:

forming a plurality of crossing choke passages in said outer channel in flow communication with each of said choke passages in which said flowable plastic melt cures solid at the same said flowable plastic melt cures solid in said choke passages thereby to reinforce a pair of opposite sides of said molded cavity in said hollow tubular rim against lateral flexure.

4. The method of making a molded plastic steering hand wheel insert recited in claim 3 wherein the step of forming a plurality of crossing choke passages in said outer channel comprises:

forming each of said crossing choke passages with a depth dimension in a range of between about 2 mm and 4 mm.

5. The method of making a molded plastic steering hand wheel insert recited in claim 2 wherein:

the step of maintaining the pressure of said injected gas after said flowable plastic melt cures solid in said choke passages causes each of said first and said second flowable melt portions to flow as a continuous layer against the walls of respective ones of said spoke channels so that each of said integral spokes of said steering hand wheel insert is a substantially hollow tube.

\* \* \* \* \*